Sept. 4, 1928. 1,682,909
E. R. JACOBI ET AL
METHOD OF MAKING METAL WHEELS
Filed June 19, 1925 6 Sheets-Sheet 1
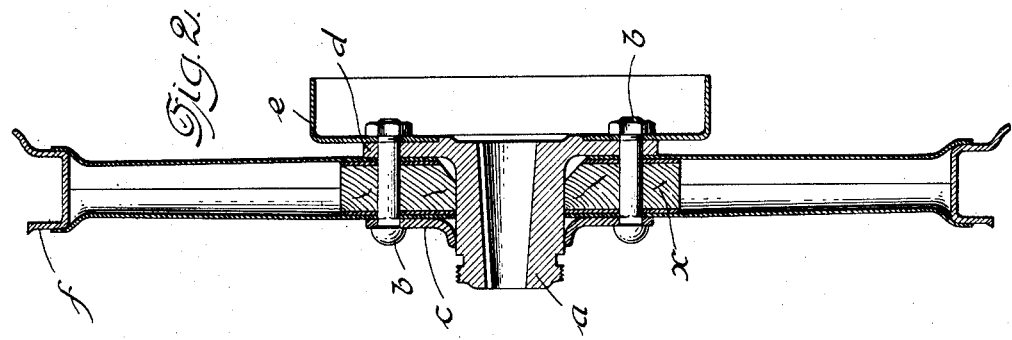
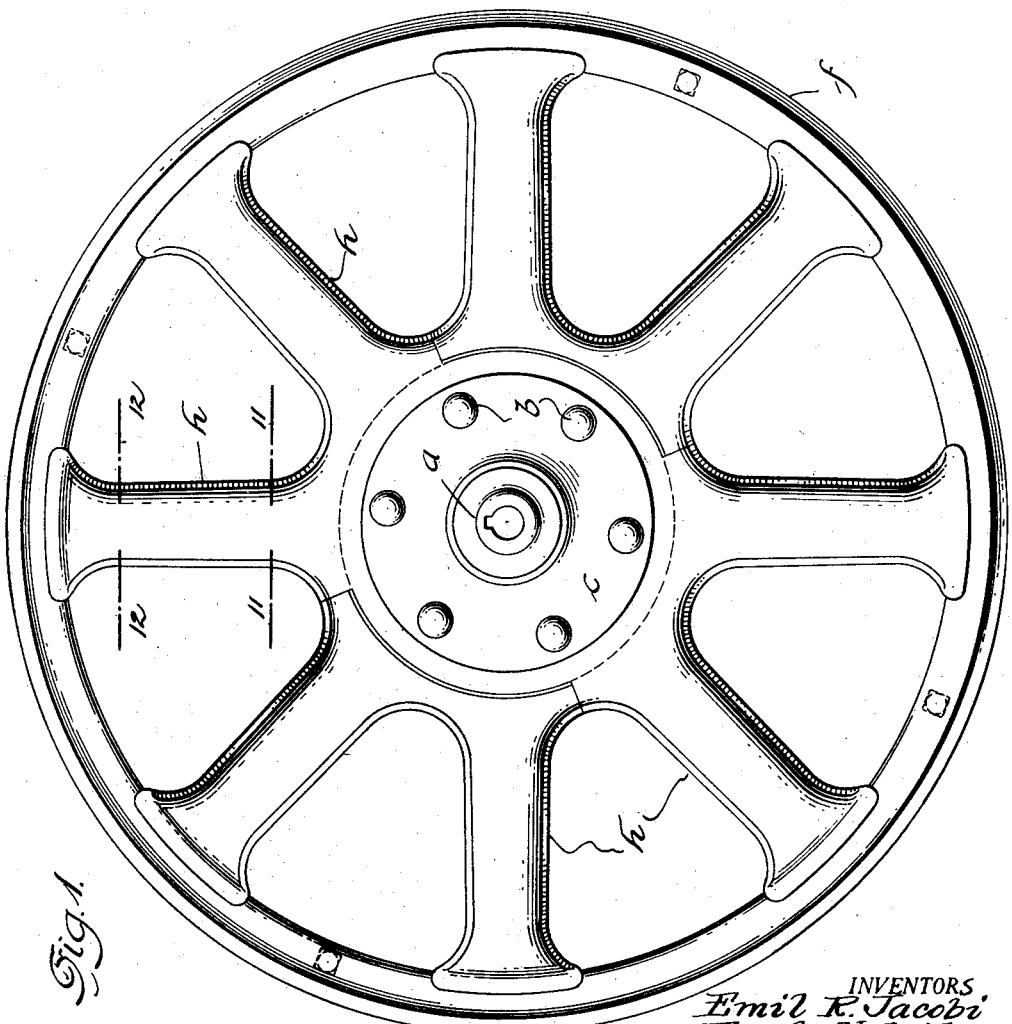
INVENTORS
Emil R. Jacobi
Frank H. LeJeune
BY
Stuart C. Barnes
ATTORNEY.

Sept. 4, 1928.
E. R. JACOBI ET AL
1,682,909
METHOD OF MAKING METAL WHEELS
Filed June 19, 1925      6 Sheets-Sheet 2
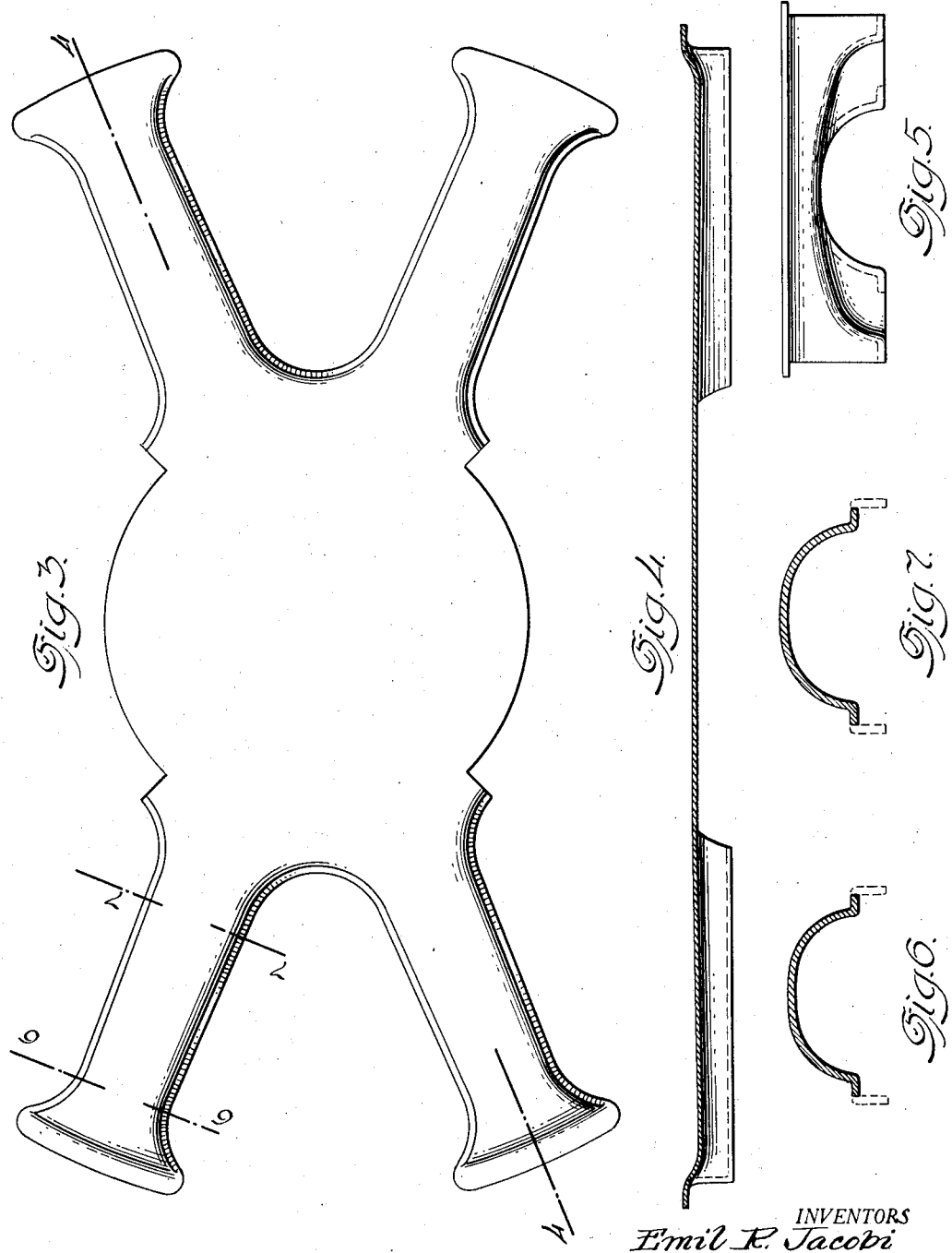
INVENTORS
Emil R. Jacobi
Frank H. LeJeune
BY
Stuart C Barnes
ATTORNEY.

Sept. 4, 1928.
E. R. JACOBI ET AL
1,682,909
METHOD OF MAKING METAL WHEELS
Filed June 19, 1925 6 Sheets-Sheet 3
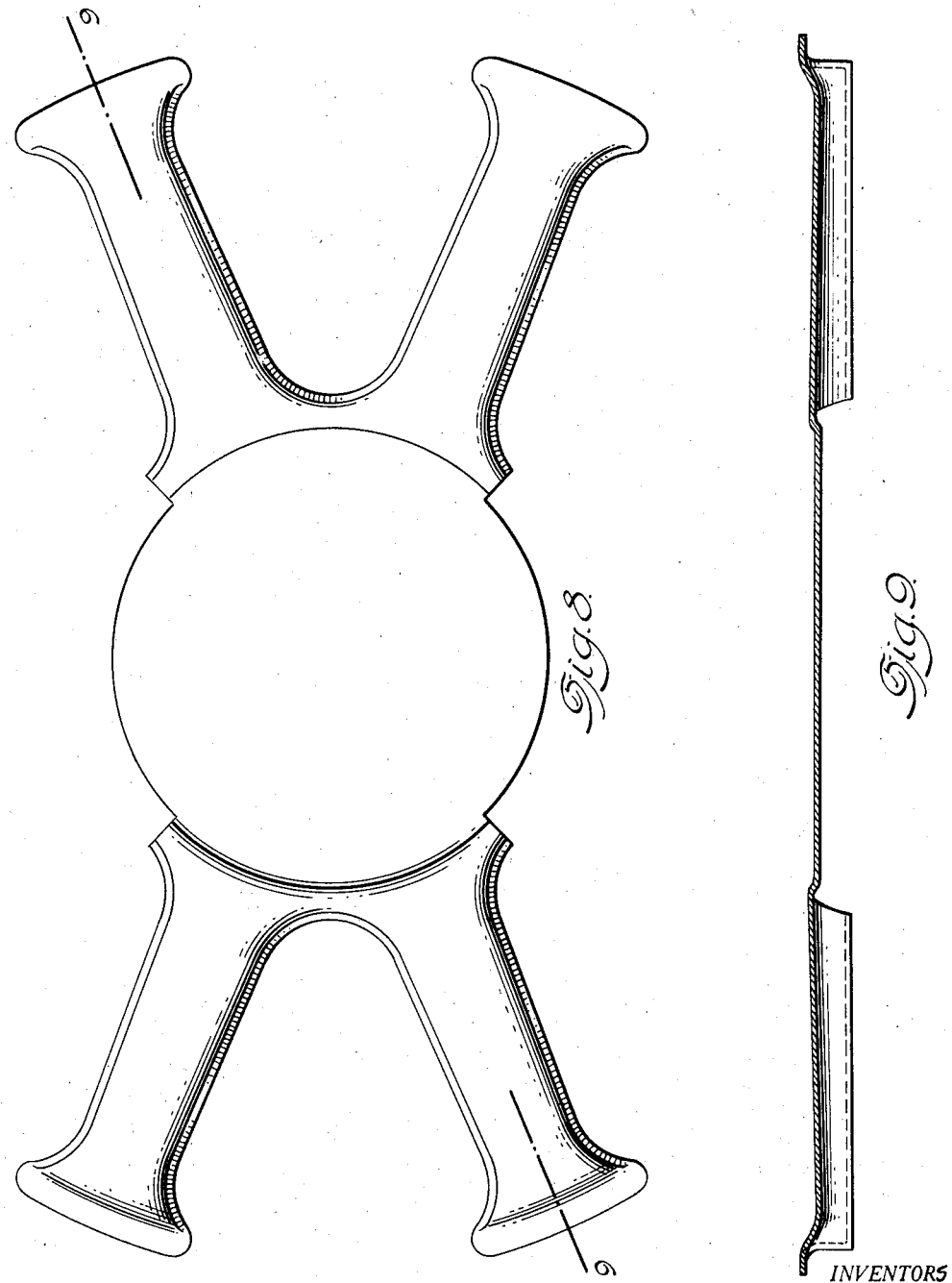
INVENTORS
Emil R. Jacobi
Frank H. LeJeune
BY
Stuart C. Barnes
ATTORNEY.

Sept. 4, 1928.  1,682,909
E. R. JACOBI ET AL
METHOD OF MAKING METAL WHEELS
Filed June 19, 1925   6 Sheets-Sheet 4
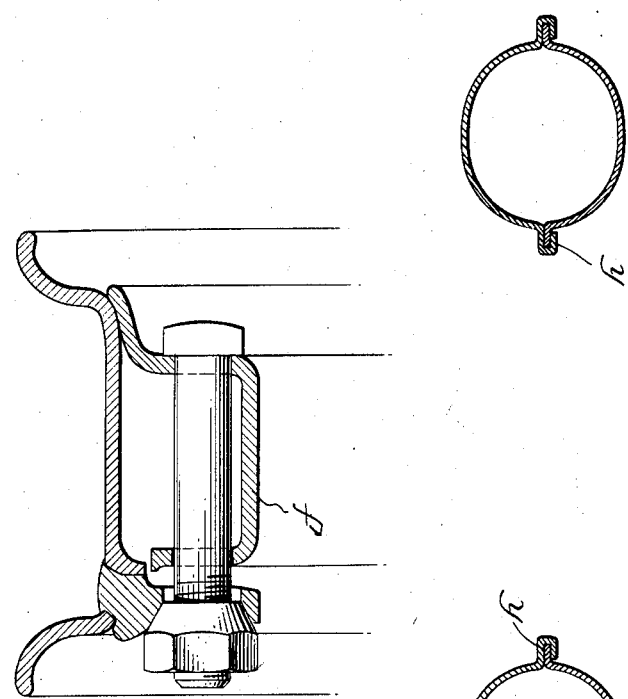
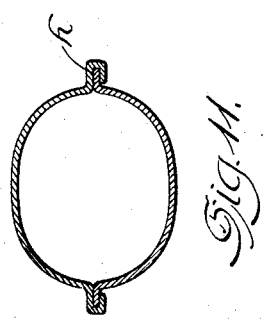
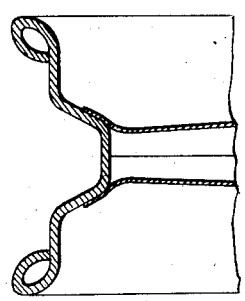
INVENTORS
Emil R. Jacobi
Frank H. LeJeune
BY
Stuart C. Barnes
ATTORNEY.

Sept. 4, 1928.
E. R. JACOBI ET AL
1,682,909
METHOD OF MAKING METAL WHEELS
Filed June 19, 1925
6 Sheets-Sheet 5
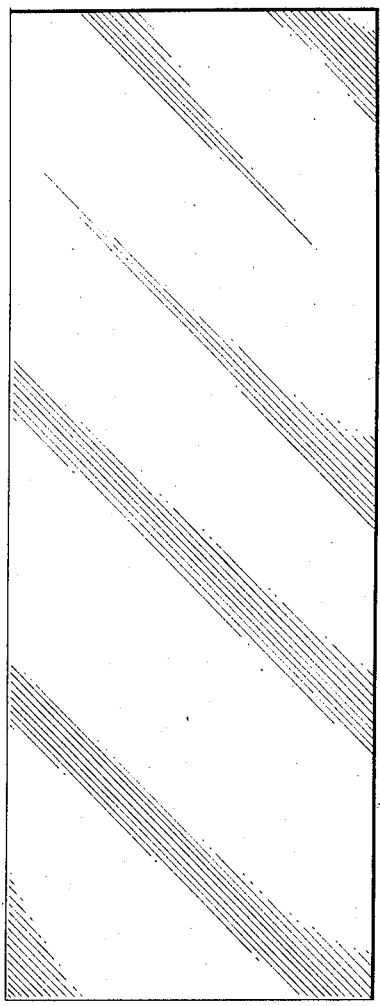
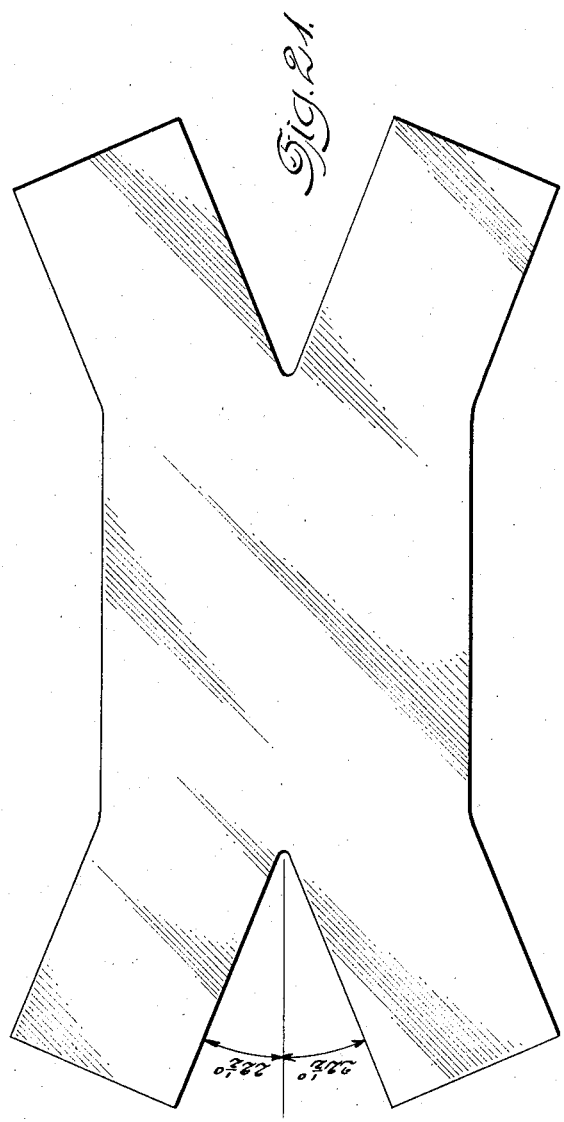
INVENTORS
Emil R. Jacobi
Frank H. LeJeune
BY
Stuart C. Barnes
ATTORNEY.

Sept. 4, 1928. 1,682,909
E. R. JACOBI ET AL
METHOD OF MAKING METAL WHEELS
Filed June 19, 1925  6 Sheets-Sheet 6
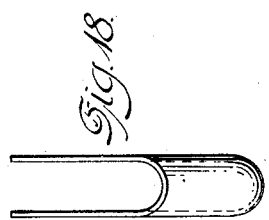
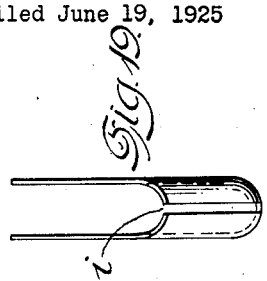
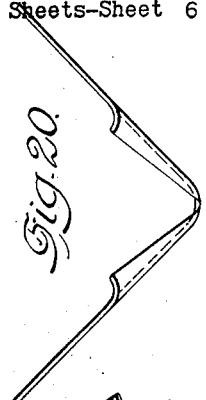
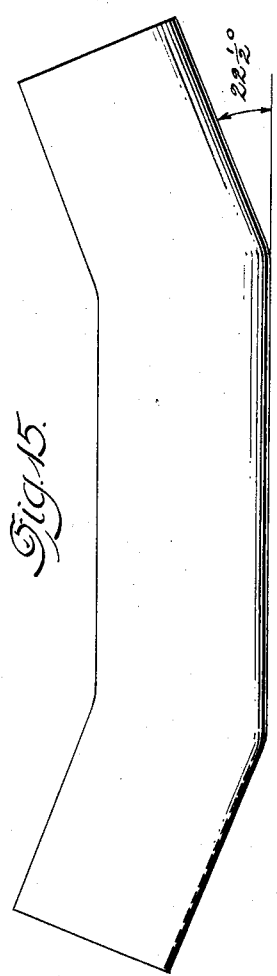
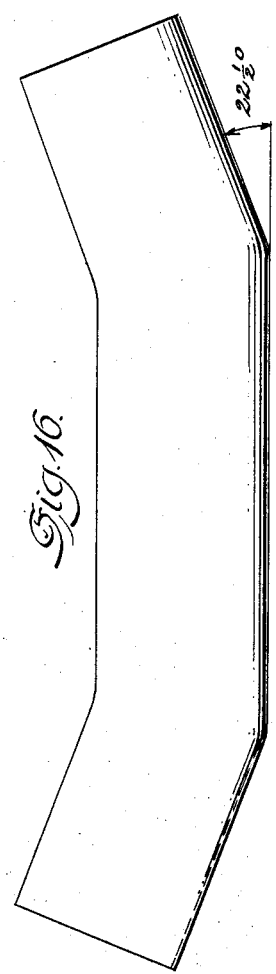
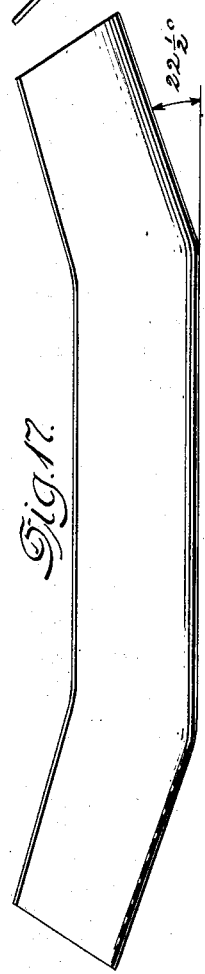
INVENTORS
Emil R. Jacobi
BY Frank H. LeJeune
ATTORNEY.

Patented Sept. 4, 1928.

1,682,909

UNITED STATES PATENT OFFICE.

EMIL R. JACOBI AND FRANK H. LE JEUNE, OF JACKSON, MICHIGAN, ASSIGNORS, BY MESNE ASSIGNMENTS, TO KELSEY-HAYES WHEEL CORPORATION, OF DETROIT, MICHIGAN, A CORPORATION OF NEW YORK.

METHOD OF MAKING METAL WHEELS.

Application filed June 19, 1925. Serial No. 38,204.

This invention relates to a method of constructing the body of a sheet metal spoked wheel, and also each section of the body. It is the object of this invention to materially lessen the waste incurred in the usual stamping operations which are employed in making wheels of this type.

In place of making a wheel with a stamped inner section and a stamped outer section, each of which is a unit, we stamp the inside portion of the wheel and the outside portion of the wheel in a number of units. Furthermore, each unit is manufactured from a blank of an area less than the space covered by the complete wheel section. Furthermore, each wheel section is made from a blank which was originally substantially a rectangle, so that the blanks can be cut out of the sheet stock with no waste whatever, and there is no appreciable waste in forming up the blank into the fashioned wheel section. This will be more fully explained hereinafter.

Referring to the drawings:

Fig. 1 is a side elevation of the completed wheel.

Fig. 2 is a cross section of the wheel.

Fig. 3 is a plan view of one of the wheel sections before the center web has been punched.

Fig. 4 is a section on the line 4—4 of Fig. 3.

Fig. 5 is an end elevation of one of the spoke sections.

Fig. 6 is a section on the line 6—6 of Fig. 4.

Fig. 7 is a section on the line 7—7 of Fig. 4.

Fig. 8 is a plan view of the companion wheel section.

Fig. 9 is a section on the line 9—9 of Fig. 8.

Fig. 10 is a cross section through the demountable and the fixed rim.

Figs. 11 and 12 are sections on the lines 11—11 and 12—12 of Fig. 1.

Fig. 13 is a plan view of the blank.

Fig. 14 is an edge view of the same.

Figs. 15 to 21 are views of the blank in the various stages of manufacture.

Fig. 22 shows the wheel applied to a drop center fixed rim.

The completed wheel is nicely shown in Figs. 1 and 2, where it will be seen that the body of the wheel is formed, preferably by four wheel sections. It is desirable to have two wheel sections on each side of the wheel. These wheel sections preferably have two spoke halves at each end and extend from substantially one side of the circumference of the fixed rim to the other circumference. Their webs overlap at the center, as is clearly shown in Fig. 2, affording a wheel center with double and reinforced strength. Preferably these webs are suitably punched to receive the hub $a$ and the bolts $b$, which bolt the cap flange $c$ to the web, and also to the flange $d$ of the hub. The brake drum $e$ may also be bolted to these members. The channel-like fixed rim $f$ is also shown in Fig. 2. However, the exact construction of the rim and the hub is more or less immaterial in so far as the method and the essential design of the wheel is concerned. These wheel sections can be locked together along the spokes, as is shown by the lock-seams $h$ in Figs. 11 and 12.

Referring to Figs. 3 to 9 inclusive, it will be seen that each wheel section is a single stamping. The one shown in Figs. 3 and 4 has a flat center web while that shown in Figs. 8 and 9 has a slight inset center web for the purpose of permitting the overlapping of the webs at the center. One of the spoke sections has a wider flange than the other, for folding over and on the outside of the lock-seam. However, this lock-seam is not an essential feature as the sections could be easily welded together or otherwise fastened; it is simply mentioned as one way of making a suitable wheel.

If the spoke sections were stamped out of a blank of the area of the completed section, as for instance, shown in Fig. 3, it will be apparent that there would be considerable waste. This is avoided by a method that is believed to be essentially novel. A flat strip of rectangular stock is cut out of the sheet metal. This is then placed in suitable dies which fold and draw the metal as shown in Figs. 15 and 18. The metal is folded into a deep U section and is angled up at each end, preferably at an angle of about 22½ degrees.

The next operation is to slot the bottom of the U section at the raised ends of the blank, as shown in Fig. 19, where the slot is designated $i$.

The next operation is shown in Figs. 17 and 20, and comprises the spreading out of the slotted blank into a blank which has a V cross section of 90 degrees. This can be done by suitable dies. The blank is now opened out so that a pair of approximately flat dies now can flatten it out into the blank shown in Fig. 21. In this shape the two legs of the blank are spread to form the spoke sections in the final blank. The spread blank may now be placed in a press with suitable dies and stamped and punched out to the contour shown in either Fig. 3 or in Fig. 8. The only waste that will be involved will be a small amount of trimming to get the proper contour of the center web and the spokes. It will be noticed that the spoke sections enlarge at the outer ends to form the fixed rim engaging segments, and flanges, but even here there is practically no waste for although it is true the body of the spoke is narrower, yet the metal is turned up here to form the flange that forms part of the lock-seam.

It will be seen by comparing the angles in Fig. 15 that the angles in the plan view Fig. 21, that the distortion or spreading of the legs of the spoke blanks is accomplished in the first stamping operation. This is really a metal drawing operation, as it will be obvious that the metal is stretched on the under side of the blank in the condition shown in Fig. 15, and is compressed along the upper edge. The metal is therefore caused to flow in the well known way achieved, in drawing operations, by suitable dies. In Figs. 16 and 19, the blank is slotted and when the blank is unfolded as shown in Figs. 17, 20 and 21, the legs of the blank have their adjoining edges simply revolved on an axis which is the longitudinal center line of the entire blank.

The legs of the spoke blanks therefore open out, always maintaining the same angle of 22½ degrees with respect to the center line of the blank. It will be obvious therefore that the spacing between the spokes and the final wheel assembly can be altered by modifying the angle given the ends of the blank in the first die operation. This spread angle of the spokes will always be just twice the angle at which the ends of the blank are turned up in the first die operation.

We have shown a filler block $x$ which is preferably used at the hub for strengthening purposes.

What we claim is:

1. The method of making a metal wheel, which comprises the distorting and slotting of an approximately rectangular unit blank at its ends to provide a blank section with spread spoke portions, then the fashioning of this prepared blank section to form a plurality of spoke portions at each end with an intervening web all in approximately the same general plane, and the fastening of a plurality of these sections together in overlapped relation at the center.

2. The method of making a metal wheel section, which comprises the folding up and drawing up of a substantially rectangular blank into a U section with one or both ends angled up, the cutting open of such end or ends, then the laying out of the blank flat, and finally the fashioning of the blank into its completed form.

3. The method of making a sheet metal wheel section, which comprises the folding and drawing up of a substantially rectangular blank with one or both ends raised up at an angle of half the spread desired in the spokes, then the slotting of the said ends and the laying out of the blank into flat form, and then the fashioning of the blank by suitable die operations to form the completed wheel section.

4. The method of making a wheel section, which comprises the folding up of a unit blank with the ends drawn up at an angle, the slotting of the ends of the blank, then the laying out of the blank in a flat form, and finally the fashioning of such prepared blank into the desired wheel section configuration.

5. The method of forming a wheel section, which comprises the folding and drawing of a blank in the form of a strip into U shape with the ends of the blank angled up, the slotting of these ends, then the spreading of the folded-together walls of the blank, then the flattening of the blank presenting spread spoke blanks, and finally the fashioning of the blank into the desired wheel section formation.

6. The method of making a stamped wheel section, which comprises the folding and the drawing of a blank smaller in width than the final spread of the wheel section, said blank being folded and drawn into a U shape with the ends of the same angled up, the slotting of such ends, the spreading them out and flattening the blank, and finally the fashioning of the same into the desired configuration to provide the completed wheel section.

7. The method of making a metal wheel spider which comprises stamping wheel spider sections from flat stock and forming each section with a central portion and with one or more half tubular spoke portions, fitting at least two of the thus formed sections together to form a side of a wheel spider with the concave side of the half tubular spokes facing inwardly of the wheel spider and then placing two of such wheel spider sides together with the half tubular spokes matched to form a complete wheel spider with tubular spokes.

8. The method of making a metal wheel spider which comprises stamping wheel spider sections from flat stock and forming each section with a central portion and with one or more half tubular spoke portions, fitting at least two of the thus formed sections together with the central portions superimposed at an angle with respect to each other to form a side of a wheel spider with the concave side of the half tubular spokes facing inwardly of the wheel spider and then placing two of such sides together with the half tubular spokes matched, to form a complete wheel spider with tubular spokes.

9. The method of forming a metal wheel spider which comprises cutting a plurality of rectangular shaped blanks of flat stock, shaping each blank into a form having a central web and half tubular spoke portions projecting from the web to form a wheel spider section, superimposing the web of one section over the web of another section with the spoke portions of the sections spaced circumferentially to form one side of the wheel spider, placing two of such sides together with the half tubular spoke portions of the sides matched to form a complete wheel spider with tubular spokes.

10. The method of making a metal wheel spider which comprises forming four similar wheel sections each having a central web with half tubular spoke portions projecting therefrom, fitting two of such sections together with the webs superimposed and with their spoke portions separated, to form one side of the wheel spider, similarly fitting the other two sections together to form the other side of the wheel spider, and then fitting the two wheel sides together with the half tubular spoke portions of one side matched with the half tubular spoke portions of the other side to form a complete wheel spider.

11. In the method of making a wheel spider which is made up of a plurality of wheel spider sections interfitted together, the steps of making a wheel spider section which comprises utilizing a substantially rectangular metal blank, shaping the blank into a spider section having a central web portion with a diameter approximately equal to one dimension of the rectangular blank and with spread spoke portions having a spread which is greater than this one dimension of the blank by stamping and distorting the metal of the blank.

In testimony whereof we affix our signatures.

EMIL R. JACOBI.
FRANK H. LE JEUNE.